(12) United States Patent
Lepkowski et al.

(10) Patent No.: US 7,022,747 B2
(45) Date of Patent: Apr. 4, 2006

(54) METHOD FOR CREATING MICROSPHERE POLYMERS AND PARTICLES

(75) Inventors: Thaddeus J. Lepkowski, Dearborn Heights, MI (US); Craig S. Schang, Brighton, MI (US); Walter H. Ohrbom, Hartland Township, MI (US)

(73) Assignee: BASF Corporation, Southfield, MI (US)

(*) Notice: Subject to any disclaimer, the term of this patent is extended or adjusted under 35 U.S.C. 154(b) by 50 days.

(21) Appl. No.: 10/426,110

(22) Filed: Apr. 29, 2003

(65) Prior Publication Data
US 2004/0220318 A1 Nov. 4, 2004

(51) Int. Cl.
*C08F 2/46* (2006.01)

(52) U.S. Cl. .............. 522/3; 522/71; 522/173; 522/178; 522/174; 522/182; 523/300; 523/318; 523/324; 523/330; 428/402; 204/157.15; 204/157.3; 204/157.44; 204/157.6; 204/157.63; 204/902

(58) Field of Classification Search .............. 522/3, 522/71, 184, 173, 178, 915, 182, 174; 523/300, 523/318, 324, 330; 428/402; 204/157.15, 204/157.44, 90, 157.6, 157.63, 157.3, 902; 250/492.1, 492, 492.22
See application file for complete search history.

(56) References Cited

U.S. PATENT DOCUMENTS

| 4,172,776 A | 10/1979 | Singelyn et al. |
| 4,285,847 A * | 8/1981 | Ting .................. 524/458 |
| 4,482,658 A * | 11/1984 | Vock et al. .............. 523/348 |
| 6,756,420 B1 | 6/2004 | Ogawa et al. |
| 2001/0036451 A1 | 11/2001 | Goupil et al. |

FOREIGN PATENT DOCUMENTS

| GB | 1104172 | 2/1968 |
| WO | WO0168720 | 9/2001 |

OTHER PUBLICATIONS

Encyclopedia of Polymer Science and Engineering, vol. 11, John Wley & Sons, 1988, pp. 186-201.
International Search Report and Written Opinion from corresponding application PCT/US2004/007075.

* cited by examiner

*Primary Examiner*—James J. Seidleck
*Assistant Examiner*—Sanza L. McClendon

(57) ABSTRACT

A polymeric material is produced by atomizing into droplets a composition containing addition-polymerizable material and reacting the addition polymerizable material in the droplets to produce the particulate product. The polymeric product may be, for example, a powder coating composition.

9 Claims, 2 Drawing Sheets

METHOD FOR CREATING MICROSPHERE POLYMERS AND PARTICLES

FIELD OF THE INVENTION

The present invention relates to methods for preparing addition polymers and compositions containing them, coating compositions containing solid particulates of addition polymers.

BACKGROUND OF THE INVENTION

Solid addition polymer-based microspheres have found many uses. In coatings, such microspheres have been used as additives for rheology control and as vehicle components of dispersion coatings. Aqueous dispersion coatings use dispersed meth(acrylic)-based vehicle components prepared straightforwardly by emulsion polymerization. Emulsion polymerization, however, typically uses emulsifiers that may make a coating more water-sensitive or that may contribute to poor coating durability.

The additives for rheology control have been prepared by less straightforward means. [The term (meth)acrylic will be used to indicate acrylic and/or methacrylic; the term (meth) acrylate will be used to indicate acrylate and/or methacrylate.] In a first method, the rheology control additives have been prepared by emulsion polymerization and then transferred into a nonaqueous dispersion medium. In a second method, the rheology control additives have been prepared by a nonaqueous dispersion reaction in weak solvents and then transferred from the weak solvents into a different organic medium suitable for a coating composition. Both methods are complex and generate undesirable waste from the media replacements.

Solid addition polymer-based particulates have also been used in powder coating compositions. Powder coating compositions are prepared by melt mixing solid polymers, pigments, and other ingredients in an extruder and grinding the extrudate, and classifying to powder to obtain the desired average particle size and particle size distribution.

In WO 98/45054, Butler et al. describe dispensing a continuous flow of a first fluid into a second fluid and onto a substrate. The chemical composition of the first fluid is altered before it contacts the substrate. The continuous fluid flows are produced, e.g., by curtain coating, slide coating, extrusion die coating, and roll coating. The WO 98/45054 document in particular describes silicone pre-polymers dispensed alone or with a carrier fluid. Preferred fluids are silicone-urea release formulations, silicone or fluorosilicone polymers, and other adhesive polymers. The fluid may contain a silyl hydride crosslinker, thermal and ultraviolet initiated platinum catalysts, chemical additives and modifiers, and particulate solids. The second fluid is chosen so that it does not interrupt the continuous flow of the first fluid. A condition, for example actinic radiation, is imposed on the first fluid. The first fluid is applied to a substrate, either as a "landing spot" from which the first fluid can be released or a coating. The process is described as useful for partially or fully curing a fluid curtain of a low viscosity formulation to increase its viscosity before deposition onto a substrate, or for polymerization of pre-polymers before they contact a heat- or light-sensitive substrate or multi-layer coating. The process could also be used to generate patterned or porous membranes or films in a fluid carrier coating method.

While the WO 98/45054 produces coatings directly on a substrate or continuous films that can be released from a substrate, a continuous film or coating layer would not be useful for improving the long-standing problems described earlier with preparing rheology control additives and powder coating compositions. Factories that already have installed coatings application equipment for liquid coating or powder coating compositions wish to continue applying such coating compositions. Accordingly, it would be beneficial to have an improved process for manufacturing liquid or powder coating compositions.

SUMMARY OF THE INVENTION

A polymeric material is produced by atomizing into droplets a composition containing addition-polymerizable material and reacting the addition polymerizable material in the droplets to produce the polymeric material. "Atomization" produces droplets in a gaseous medium, e.g., air or an inert atmosphere such as nitrogen.

In one embodiment, the method is used to produce a crosslinked product. The addition-polymerizable material includes at least one monomer (or macromonomer) that has at least two addition-polymerizable groups. The crosslinked product may be formulated, for example, to be suitable for use as a "microgel" rheology control agent in a liquid coating composition.

In a further embodiment, the polymeric material produced is suitable as an associative thickener or rheology control additive in a liquid coating composition. To behave as an associative thickener, the particulate product is formulated to have multiple surface groups that interact with each other in the coating composition to cause the thickening effect.

In another embodiment, the polymeric material produced is a powder coating comprising an addition polymer or addition oligomer, a crosslinking agent reactive with the polymer or oligomer, and optionally pigment and/or other material typically included in powder coating compositions. The powder coating composition may be applied by conventional means to a suitable substrate and cured to form a cured coating on the substrate. This method of preparing a powder coating composition is particularly advantageous when the conventional method of melt mixing in an extruder and crushing the extrudate would damage or destroy a desired component, such as a flake pigment, or may result in premature curing for the desired curing mechanism.

Still further, the method of the invention can be used to prepare a polymerized product such as might be produced in an emulsion polymerization process while avoiding the need to make a dispersion. For example, the method of the invention can be used to promote random polymerization for monomer mixtures that in a solution polymerization would tend to block polymerize. This method is particularly advantageous for making such polymers when it is desirable to avoid the kind or amount of liquid medium that would be necessary for emulsion polymerization.

The method of the invention may also be used to prepare a polymerized product that may be dissolved in a solvent medium. The method may then offer a lower cost alternative to "A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of up to 5% in the value.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
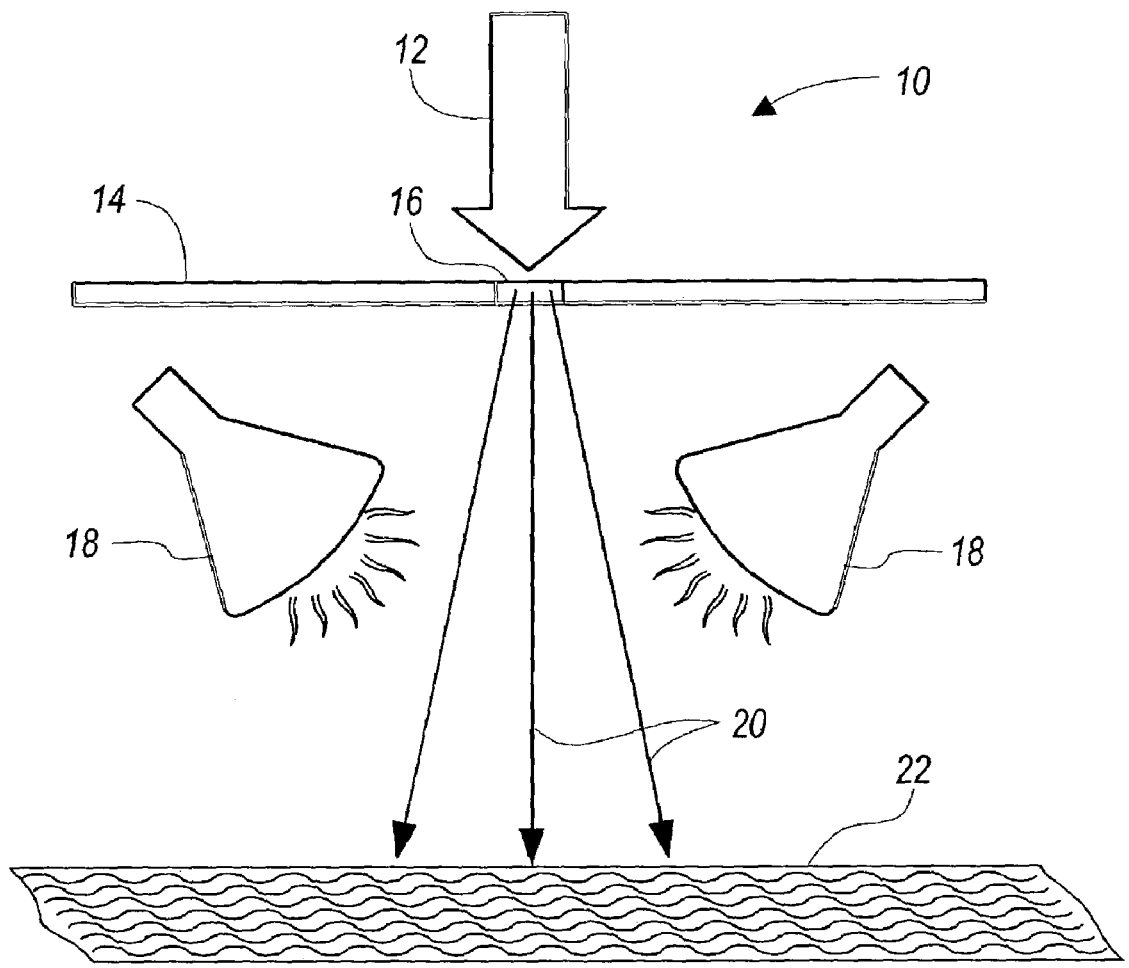
FIG. 1 is a diagram of an apparatus for carrying out an embodiment of the inventive method.
Figure 2:
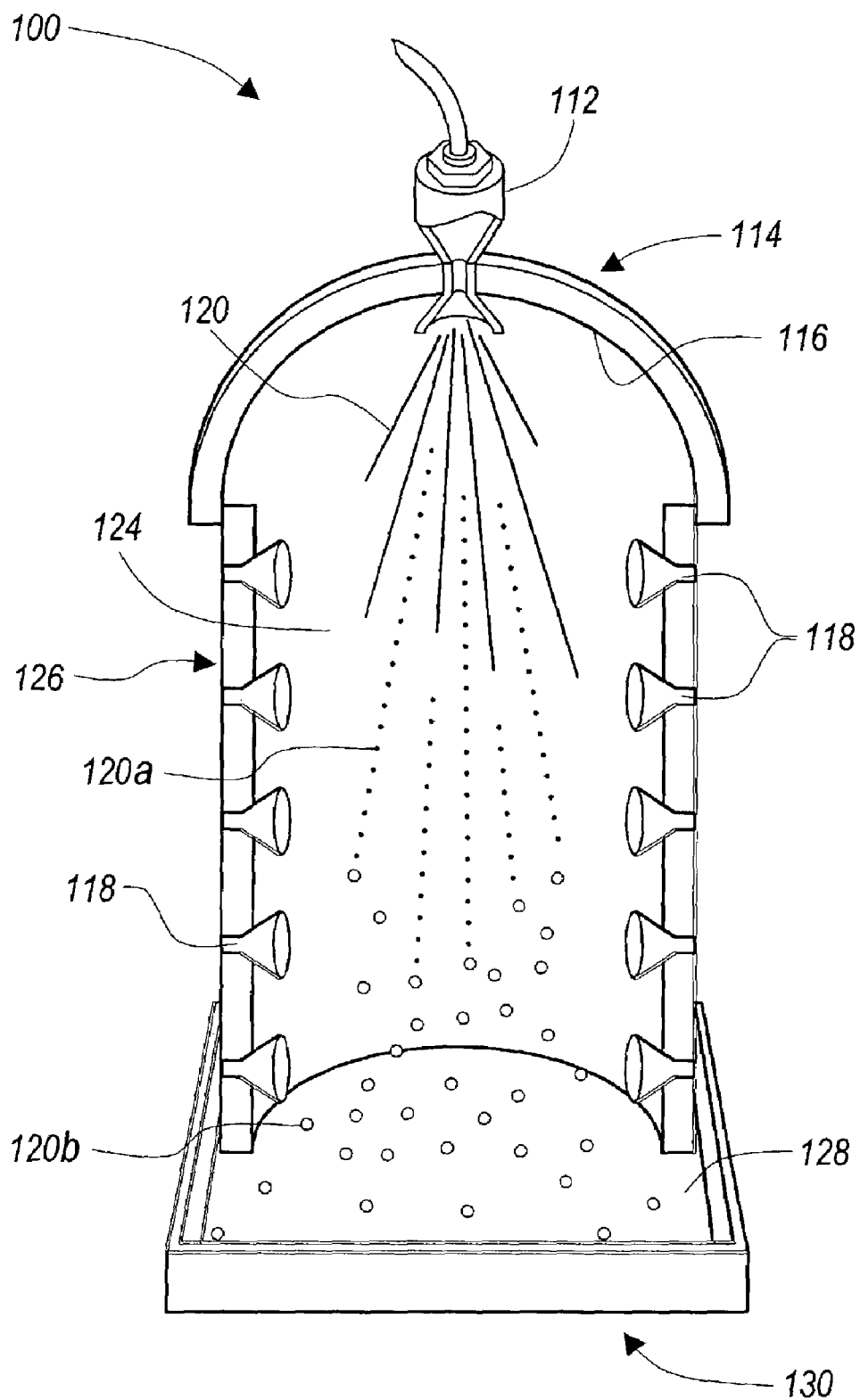
FIG. 2 is a diagram of an apparatus for carrying out a second embodiment of the inventive method.

Further areas of applicability of the present invention will become apparent from the following detailed description. The description of the preferred embodiment(s) and specific examples is intended for purposes of illustration only and is in no way intended to limit the invention, its application, or uses.

A particulate polymeric material is produced by atomizing a liquid composition containing addition polymerizable material. The addition polymerizable material may be, for example, ethylenically unsaturated monomers, macromonomers, or other oligomeric or polymeric materials having ethylenic unsaturation. Examples of such monomers and co-monomers include, without limitation, α,β-ethylenically unsaturated monocarboxylic acids containing 3 to 5 carbon atoms such as acrylic, methacrylic, and crotonic acids and the esters of those acids; α,β-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; hydroxyethyl acrylate, hydroxyethyl methacrylate, hydroxypropyl acrylate, hydroxypropyl methacrylate, hydroxybutyl acrylate, and hydroxybutyl methacrylate; glycidyl methacrylate, glycidyl acrylate, isocyanatoethyl methacrylate, and other ethylenically unsaturated monomers containing groups reactive with a crosslinking agent or each other following polymerization; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, allyl methacrylate, and vinyl ethyl ketone. Representative examples of aromatic or heterocyclic aliphatic vinyl compounds include, without limitation, such compounds as styrene, α-methyl styrene, vinyl toluene, tert-butyl styrene, and 2-vinyl pyrrolidone. The co-monomers may be used in any combination.

Macromonomers having an ethylenically unsaturated group may also be included. Such monomers are known and commercially available. Macromonomers may include, for example, polyurethane- and polyester-based materials.

In one embodiment, the monomer mixture includes a monomer having two or more addition polymerizable double bonds and the particulate product is a crosslinked particulate product. Illustrative examples of monomers having two or more ethylenically unsaturated moieties include, without limitation, (meth)acrylate esters of polyols such as 1,4-butanediol di(meth)acrylate, 1,6-hexanediol di(meth)acrylate, neopentyl glycol di(meth)acrylate, trimethylolpropane tri(meth)acrylate, tetramethylolmethane tetra(meth)acrylate, pentaerythritol tetra(meth)acrylate, dipentaerythritol penta(meth)acrylate, dipentaerythritol hexa(meth)acrylate, alkylene glycol di(meth)acrylates and polyalkylene glycol di(meth)acrylates, such as ethylene glycol di(meth)acrylate, butylene glycol di(meth)acrylate, diethylene glycol di(meth)acrylate, triethylene glycol di(meth)acrylate, and polyethylene glycol di(meth)acrylate; divinylbenzene, allyl methacrylate, diallyl phthalate, diallyl terephthalate, and the like, singly or in combinations of two or more.

The monomer mixture may include other materials, for example and without limitation, oligomers or polymers, crosslinking agents, catalysts, pigments, volatile materials (e.g., organic solvents), and coating additives. Examples of oligomers and polymers that may be in the monomer mix include, without limitation, polyesters, alkyds, polyurethanes, and vinyl copolymers including acrylic copolymers. Examples of crosslinking agents that may be in the monomer mix include, without limitation, aminoplasts and isocyanate crosslinking agents. Examples of suitable aminoplast crosslinkers are benzoguanamine, melamine-formaldehyde, and urea-formaldehyde resins. Particularly preferred are melamine formaldehyde resins, especially fully alkylated, monomeric melamine formaldehyde resins, and blocked polyisocyanates, especially blocked aliphatic isocyanurates such as the isocyanurates of isophorone diisocyanate or hexamethylene diisocyanate blocked with, for example, methyl ethyl ketoxime. A mixture of crosslinking agents may be used. Examples of catalysts and other coating additives that may be in the monomer mix include, without limitation, For example, when aminoplast compounds, especially monomeric melamines, are used as a curing agent, a strong acid catalyst may be utilized to enhance the cure reaction. Such catalysts are well-known in the art and include, without limitation, p-toluene sulfonic acid, methane sulfonic acid, nonylbenzene sulfonic acid, dinonylnaphthalene disulfonic acid, dinonylnaphthalene sulfonic acid, dodecylbenzenesulfonic acid, phenyl acid phosphate, monobutyl maleate, butyl phosphate, monoalkyl and dialkyl acid phosphates, and hydroxy phosphate ester. Strong acid catalysts may be blocked, e.g. with an amine. Other catalysts that may be useful in the composition of the invention include Lewis acids, zinc salts, and tin salts. Additional agents, for example surfactants, stabilizers, wetting agents, rheology control agents and flow modifiers, surface modifying agents such as to enhance resistance to staining, scratching, or marring, dispersing agents, adhesion promoters, UV absorbers, hindered amine light stabilizers, etc. may be incorporated into the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Examples of solvents that may be in the monomer mix include, without limitation, water, aromatic hydrocarbons, ketones, esters, glycol ethers, and esters of glycol ethers. Specific examples include, without limitation, methyl ethyl ketone, methyl isobutyl ketone, m-amyl acetate, ethylene glycol butyl ether and ethylene glycol monobutyl ether acetate, propylene glycol monomethyl ether and propylene glycol monomethyl ether acetate, xylene, N-methylpyrolidone, blends of aromatic hydrocarbons, and mixtures of these.

The monomer mixture may contain a photoinitiator and, optionally, a photosensitizer so that it reacts upon atomization and exposure to ultraviolet radiation. The monomer mixture may also be reacted by exposing the atomized composition to other forms of radiation, such as electron beam radiation. With electron beam radiation, a photoinitiator would not be needed.

When ultraviolet radiation is used to polymerize the monomers, a photoinitiator is included in the composition. The photoinitiator may be selected from any of those known in the art. Examples of compounds known to be useful as photoinitiators include, for example and without limitation, benzoin ethers such as benzoin methyl ether, benzoin ethyl ether, benzoin phenyl ether, and so on; alkylbenzoins such as methylbenzoin, ethylbenzoin, and so on; benzyl derivatives including benzyldimethylketal; 2,4,5-triarylimidazole dimers including 2-(o-chlorophenyl)-4,5-diphenylimidazole dimer, 2-(o-chlorophenyl)-4,5-di(m-methoxyphenyl)imidazole dimer, 2-(o-fluorophenyl)-4,5-phenylimidazole dimer, 2-(o-methoxyphenyl)-4,5-diphenylimidazole dimer, 2-(p-methoxyphenyl)-4,5-diphenylimidazole dimer, 2,4-di(p-methoxyphenyl)-5-phenylimidazole dimer, 2-(2,4-dimethoxyphenyl)-4,5-diphenylimidazole dimer, and so on; acridine derivatives such as 9-phenylacridine and 1,7-bis(9, 9'-aridinyl)heptane; N-phenylglycine; benzophenone, anthraquinone, thioxanthone, and derivatives including trimethylbenzophenone, isopropylthioxanthone, 2-chloro and 2-ethyl-thioxanthone, and hydroxy benzophenone; acetophenone derivatives including 2,2-dimethoxy-2-phenylacetophenone, 2,2-diethoxyacetophenone, 2,2-dimethoxy-2-phenylacetophene, 1-hydroxycyclohexylacetophenone, 2-hydroxy-2-methyl-1-phenylpropanone, 4-benzoyl-4'-methyl-diphenyl sulphide, ethyl 4-dimethylamino benzoate, 2-ethyl-hydroquinone, 2,4,6-trimethyl benzoyl diphenyl phosphine oxide, and combinations of these. Commercial photoinitiators are available, for example, from Ciba (based in Switzerland), Lamberti (based in Italy), and First Chemical (Massagula, Miss.).

In general, the photoinitiator, when included, is included in an amount of at least about 0.1%, preferably at least about 1%, by weight, and up to about 20%, preferably up to about 10% by weight, based on the total weight of the monomer mixture. In preferred embodiments, the photoinitiator may be included in amounts of from about 0.1% to about 20% by weight, more preferably from about 1% to about 10% by weight, still more preferably from about 2% to about 8% by weight, and yet more preferably from about 3% to about 7% by weight, based on the total weight of the monomer mixture.

Examples of suitable sensitizes include 4,4-dimethylamino-benzophenone, benzophenone, triethanolamine, N-methyl-diethanolamine, 2-(butoxy)ethyl, 4-dimethylamino benzoate and acrylated amines.

In general, the photosensitizer, when included, is included in an amount of at least about 0.05%, preferably at least about 1%, by weight, and up to about 10%, preferably up to about 8% by weight, based on the total weight of the monomer mixture. In preferred embodiments, the photosensitizer may be included in amounts of from about 0.05% to about 10% by weight, more preferably from about 1% to about 10% by weight, still more preferably from about 2% to about 8% by weight, and yet more preferably from about 3% to about 7% by weight, based on the total weight of the monomer mixture.

It is also contemplated that the droplets of addition polymerizable monomer may be polymerized thermally, in particular by heating with infrared lamps. Typical thermal initiators are organic peroxides such as dialkyl peroxides, peroxyesters, peroxydicarbonates, diacyl peroxides, hydroperoxides, and peroxyketals; and azo compounds such as 2,2'azobis(2-methybutanenitrile) and 1,1'-azobis(cyclohexanecarbonitrile). Typical chain transfer agents are mercaptans such as octyl mercaptan, n- or tert-dodecyl mercaptan; halogenated compounds, thiosalicylic acid, mercaptoacetic acid, mercaptoethanol, and dimeric alpha-methyl styrene.

In general, the thermal initiator, when included, is included in an amount of at least about 0.1%, preferably at least about 1%, by weight, and up to about 20%, preferably up to about 15% by weight, based on the total weight of the monomer mixture. In preferred embodiments, the thermal initiator may be included in amounts of from about 0.1% to about 20% by weight, more preferably from about 1% to about 15% by weight, still more preferably from about 5% to about 10% by weight, based on the total weight of the monomer mixture. The chain transfer agent when included, is included in an amount of at least about 0.1%, preferably at least about 0.5%, by weight, and up to about 15%, preferably up to about 5% by weight, based on the total weight of the monomer mixture. In preferred embodiments, the chain transfer agent may be included in amounts of from about 0.1% to about 15% by weight, more preferably from about 0.5% to about 15% by weight, still more preferably from about 1% to about 5% by weight, based on the total weight of the monomer mixture.

The polymerizable composition can be atomized by any suitable method, such as pneumatic, hydraulic, and kinetic atomization methods. Suitable methods include, without limitation, atomization using a rotary atomizer, air atomization (e.g., using a spray gun and air pressure), pressure atomization, vacuum atomization (e.g., by spraying from high pressure into low pressure zone), and ultrasonic atomization. The atomization conditions may be controlled to provide a desired atomized droplet size, and, in turn, a desired particle or droplet size for the polymeric product. These atomization processes are known and details of the atomization processes are readily available.

The polymerizable composition can be atomized through an orifice in a protective shield. The shield encloses the UV light, electron beam radiation, or other radiation to which the atomized droplets are exposed. A shield may be placed between the atomizing equipment and the radiation and/or between the collecting area that collects the particulate product and the radiation. In another embodiment, the polymerizable composition is atomized into a tunnel, is exposed to the radiation or heat for thermal cure inside the tunnel, and the particulate product is collected from the other end of the tunnel. For example, UV lamps or IR lamps may be located along the walls of the tunnel. The shield or tunnel walls may be formed from metals, ceramics, suitable plastics, and so on. In the case of a tunnel, it is preferred to provide air or electric charge repulsion to keep the stream of atomized droplets generally away from the tunnel walls.

FIG. 1 is a diagram of an apparatus 10 for carrying out the inventive method in which an addition-polymerizable composition is sprayed at arrow 12 through aperture 16 in shield 14 as streams 20 of atomized droplets. Radiation sources 18, which may be, e.g., UV lamps, gamma radiation lamps, or infrared radiation lamps, are directed toward the streams 20 of atomized droplets, polymerizing the composition into a particulate polymeric product. The product is collected on collection surface 22.

In FIG. 2, the polymerization is carried out with apparatus 100, which includes an enclosure 114. Addition-polymerizable composition is fed to atomizer 112, which directs streams 120 of atomized droplets 120*a* through shield 116. Interior 124 may contain an inert atmosphere, such as nitrogen, which may be maintained by introducing inert gas through an inlet (not shown). Radiation sources 118 are mounted along walls of tunnel 126 and directed toward the atomized droplets 120*a*, polymerizing the composition into a particulate polymeric product 120*b*. The product 120*b* is collected in collection receptacle 130. Receptacle 130 may contain a medium, such as deionized water, into which the particulate polymeric product 120*b* falls.

The atomized droplets of the polymerizable composition are polymerized by exposure to a curing radiation or heat. Preferably, the polymerizable composition is exposed to ultraviolet radiation, electron beam radiation, infrared radiation, or gamma radiation. The initiator is selected to be appropriate to the type of radiation or heat selected for polymerization.

Alternatively, the polymerizable composition can be atomized and polymerized by ultrasonic cavitation. In this case the stream of monomer mix may be vaporized into droplets by being subjected to an ultrasonic horn or whistle.

The polymeric product is collected after exposure to the radiation or thermal heat for curing. In one embodiment, the polymeric product is a particulate that is collected from water or other liquid. The polymeric product may also be collected, for example, on a conveyor belt of an appropriate material or in a suitable container or bag. The polymeric product may have a particle size The solid particulate product may be incorporated into a solventborne or waterborne coating composition. In one embodiment, the solid particulate product is useful as a rheology control additive, in particular as a crosslinked microgel additive or as an associative thickener. For example, the liquid mixture is formulated to provide a particulate product having a sufficient number surface groups that interact with each other in the coating composition to cause the thickening effect. The surface groups may be, for example, groups that participate in hydrogen bonding, such as hydroxyl, carboxylic acid, carbonyl, and/or N—H or S—H groups. Ethylenically unsaturated materials that contain such groups are known and include, for example and without limitation, hydroxyalkyl (meth)acrylates, ethylenically unsaturated acids such as acrylic acid, vinyl ketones, and so on.

In another embodiment, the polymeric product is a solid particulate containing a mixture of the addition polymer formed from the monomers, a crosslinked agent, and optionally other materials suitably included in powder coatings. The polymeric particulate product may be collected in an aqueous medium to form a so-called powder coating slurry. The addition polymer has functional groups reactive with the crosslinking agent. An addition polymer with functional groups may be prepared by using an ethylenically unsaturated monomer comprising the functional group, in the same way that such polymers are prepared by solution or emulsion polymerization or by other means for coating compositions.

The polymerizable material may contain other solid or liquid materials that are not polymerizable, including resins, oligomers or polymers, solvents, dyes, particulates including fillers and pigments, including flake pigments such as aluminum pigment and pearlescent pigments, catalysts, coating additives, and so on. Preferably, volatile organic compounds such as volatile organic solvents are omitted. It may be desirable to incorporate into the polymerizable material for making a powder coating composition these kinds of additional materials, particularly fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers (preferably omitted if the polymerizable material is cured with UV radiation), antioxidants, and/or catalysts to aid in curing the powder coating composition. Moreover, a texturing agent may also be included, for example to more finely adjust the degree of texture.

Pigments and fillers may be utilized in amounts typically of up to 40% by weight, based on total weight of the composition. The pigments used may be inorganic pigments, including metal oxides, chromates, molybdates, phosphates, and silicates, metallic pigments including aluminum pigments, mica flake pigments, and organic pigments such as metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like. Pigments may be stirred into low viscosity, polymerizable compositions. If desired, pigments may be milled according to known procedures before being added to the polymerizable compositions or may be milled in or with the composition containing the addition-polymerizable material.

It is advantageous to make a powder coating composition by the inventive method for several reasons. First, a metallic or pearlescent powder coating may be prepared without the degradation of the metal or mica flake pigment that would result in the extruder melt-mix method. Secondly, the atomizing conditions can be controlled to produce droplet sizes, and therefrom particulate sizes, more uniform and more easily obtained than through the grinding and classifying steps by which powder coatings are conventionally made. The polymeric product (which, in the case of a powder coating composition, is a solid particulate) may have an average particle size of from about 0.1 micron to about 300 microns. Preferably, the average particle size is at least about 0.1 micron, more preferably at least about 1 micron, still more preferably at least about 10 microns, and even yet more preferably at least about 20 microns. Preferably, the average particle size is up to about 300 microns, more preferably up to about 100 microns, still more preferably up to about 50 microns, and even yet more preferably up to about 40 microns. The average particle size of the polymeric product is preferably in a range from about 1 to 200 microns, more preferably from about 10 to 100 microns, and yet more preferably from about 20 to about 50 microns.

Further, the equipment for the present method is much less expensive than the extruder and grinding equipment that would otherwise be required. Finally, the powder coating composition can utilize cure mechanisms when made with the present method that would not otherwise be possible because of the temperatures needed for the melt mixing step. For instance, the powder coating composition provided by the present process may have an aminoplast crosslinker, e.g. a melamine formaldehyde resin, that reacts with an active hydrogen functionality on the addition polymer, e.g. hydroxy, amine, or carbamate functionality. In the case of blocked isocyanate crosslinkers, it is possible to use a blocking agent that unblocks at a lower temperature while avoiding any premature reaction that could be expected if such a powder coating composition were melt compounded in an extruder. Of course, compositions containing conventional powder coating crosslinkers such as epoxide-functional or acid-functional materials may also be prepared by the present invention. In this case, too, any premature reaction of the crosslinking agent that may take place if such a powder coating were melt mixed in an extruder is avoided.

The composition preferably contains one or more crosslinking agents that react with the addition polymer after the coating composition is applied to form a cured coating.

Coating compositions produced according to the method of the invention can be applied to a desired substrate by suitable, conventional methods. These include, for example, spray coating, dip coating, roll coating, curtain coating, fluidized bed application, and the like.

The thermosetting powder coating composition polymeric product containing the addition polymer, crosslinker, and other desired materials can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions. Application can be by electrostatic spraying or by use of a fluidized bed. Electrostatic spraying is the preferred method. The coating powder can be applied in one or more passes to provide a film thickness after cure of from 25 to 400 microns. The substrate can optionally be preheated prior to application of a powder coating composition to promote uniform and thicker powder deposition. The powder coating may be applied in a coil coating process.

After application of the coating composition to the substrate, the coating is cured, preferably by heating at a temperature and for a length of time sufficient to cause the reactants to form an insoluble polymeric network. The cure temperature is usually from about 100° C. to about 220° C., and the length of cure is usually about 15 minutes to about 60 minutes. Preferably, the coating is cured at about 110° C. to about 180° C. for about 20 to about 30 minutes. Heating can be done in infrared and/or convection ovens.

EXAMPLE 1 OF THE INVENTION

A mixture of 5 parts by weight styrene, 9.5 parts by weight butyl acrylate, 4.2 parts by weight hydroxyethyl acrylate, and 1 part by weight IRGACURE 2020 is atomized by air atomization to a droplet size of approximately 10 to 30 microns. The atomized mixture is exposed to about 6.4 J/cm$^2$ of UVA radiation. The particulate product is collected on a solid substrate. The particulate product is collected by rinsing the polymeric product off the substrate with a suitable solvent.

A coating composition is prepared by adding to the polymeric product in the wash solvent 8.1 parts by weight of hexamethoxymethyl melamine and customary coating additives. The coating composition of the invention is applied to a phosphated steel substrate over a layer of a basecoat coating composition and the basecoat and the coating composition of the invention are cured together by baking 30 minutes in a convection oven set at 121° C.

EXAMPLE 2 OF THE INVENTION

A premix of 8.1 parts by weight of hexamethoxymethyl melamine, 5 parts by weight of titanium dioxide, and 3 parts by weight of barytes are milled in an attritor to a pigment fineness of 7 on a Hegman grind gauge. The milled pigment melamine mixture is then combined with 5 parts by weight styrene, 8.5 parts by weight butyl methacrylate, 4.2 parts by weight hydroxyethyl methacrylate, 1 part by weight methacrylic acid, and 1 part by weight IRGACURE 2020. The mixture containing the monomers is then atomized by air atomization and exposed to radiation as in Example 1. The pigmented particulate product is collected in a receptacle containing 75 parts by weight of deionized water to produce an aqueous slurry.

The aqueous slurry of the particulate product is applied as a coating layer on a phosphated steel substrate. The applied composition is allowed to flash for about 10 minutes and is then baked for 30 minutes in a convection oven set at 121° C.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of making a slurry of a particulate polymeric material, comprising steps of:

atomizing into droplets a composition comprising addition-polymerizable material and a crosslinking agent, where the crosslinking agent is selected from the group consisting of aminoplast crosslinking agents, isocyanate crosslinking agents, and combinations thereof;

addition polymerizing the addition-polymerizable material in the droplets to produce the particulate polymeric material reactive with the crosslinking agent; and collecting the particulate polymeric material in an aqueous medium to form an aqueous slurry of the particulate polymeric material.

2. A method of preparing a coating composition, comprising atomizing into droplets a composition containing addition-polymerizable material and a crosslinking agent, where the crosslinking agent is selected from the group consisting of aminoplast crosslinking agents, isocyanate crosslinking agents, and combinations thereof, reacting the addition polymerizable material in the droplets to produce a particulate product reactive with the crosslinking agent, and incorporating the particulate product into a liquid coating composition, wherein the particulate product behaves as an associative thickener or as a rheology control agent in the liquid coating composition.

3. A method according to claim 2, wherein the composition containing addition-polymerizable material comprises at least one monomer that has at least two addition-polymerizable groups and further wherein the particulate product acts as a rheology control agent in the coating composition.

4. A method according to claim 2, wherein particulate product acts as an associative thickener in the coating composition.

5. A method of preparing a powder coating composition, comprising
preparing a composition containing addition-polymerizable material, a crosslinking agent, and pigment, wherein the crosslinking agent is selected from the group consisting of aminoplast crosslinking agents, isocyanate crosslinking agents, and combinations thereof;
atomizing into droplets the composition; and
reacting the addition polymerizable material in the droplets to produce a powder coating composition comprising an addition polymer reactive with the crosslinking agent, and the pigment.

6. A method according to claim 5, wherein the pigment comprises a pigment selected from the group consisting of aluminum pigments and pearlescent pigments.

7. A method according to claim 5, wherein the average size of the droplets is approximately the desired average particle size of the powder coating composition.

8. A method according to claim 5, wherein the crosslinking agent is an aminoplast crosslinking agent.

9. A method according to claim 5, wherein the crosslinking agent is an isocyanate crosslinking agent.

* * * * *